(12) United States Patent
Hooijer et al.

(10) Patent No.: US 6,411,533 B2
(45) Date of Patent: Jun. 25, 2002

(54) AC-DC CONVERTER ADDING AN OFFSET SIGNAL TO AN INDUCTOR CURRENT SIGNAL

(75) Inventors: Christofher Daniel Charles Hooijer; Petrus Cornelius Maria Marien, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/837,940

(22) Filed: Apr. 19, 2001

(30) Foreign Application Priority Data

Apr. 21, 2000 (EP) .............................. 00201451

(51) Int. Cl.⁷ .............................................. H02M 7/04
(52) U.S. Cl. ...................................................... 363/89
(58) Field of Search ............................ 363/80, 81, 125, 363/127, 89, 84

(56) References Cited

U.S. PATENT DOCUMENTS

| | | | |
|---|---|---|---|
| 4,683,529 A | 7/1987 | Bucher, II | 363/44 |
| 5,001,620 A | * 3/1991 | Smith | 363/89 |
| 5,619,405 A | 4/1997 | Kammiller et al. | 363/80 |
| 5,644,214 A | * 7/1997 | Lee | 323/211 |

FOREIGN PATENT DOCUMENTS

EP 0921626 A2 12/1998

OTHER PUBLICATIONS

Carlos A. Canesin et al, Analysis and Design of Constant–Frequency Peak–Current–Controlled High–Power–Factor Boost Rectifier with Slope Compensation (e.g., bandwidth) prior to connecting two networked devices, □packetize□ different types of data, Mar. 1996, pp. 807–813.

* cited by examiner

*Primary Examiner*—Adolf Deneke Berhane

(57) ABSTRACT

In an upconverter operating in the transient mode, an offset signal is added to the signal at the current sensing pin of the control IC. The upconverter generates a comparatively low THD even if the supply voltage and/or the power supplied by the upconverter are varied over a wide range.

9 Claims, 2 Drawing Sheets

Figure 3A:
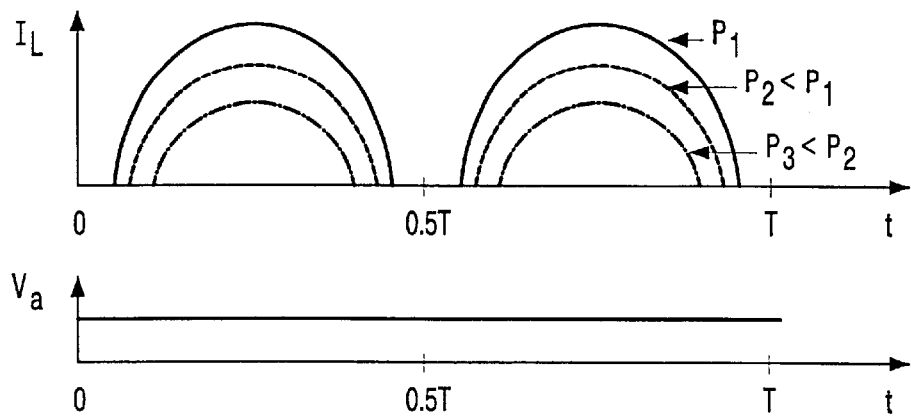

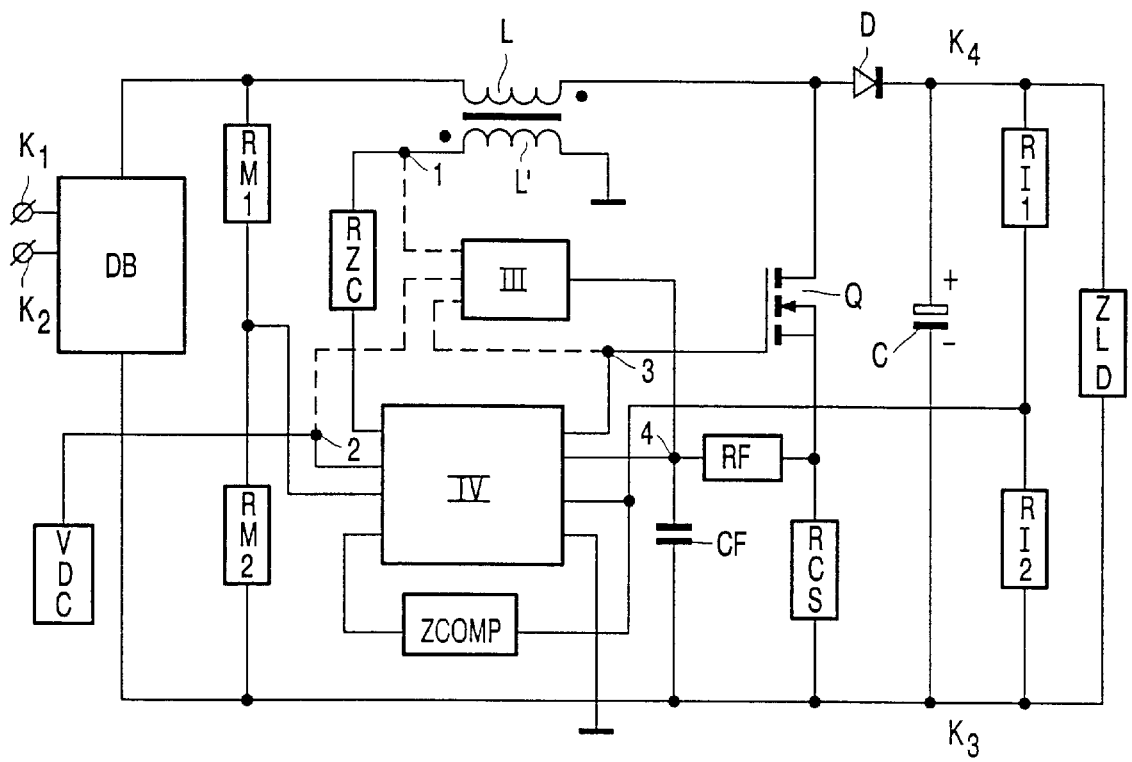
FIG. 1
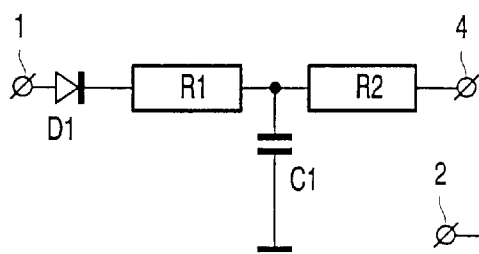
FIG. 2B
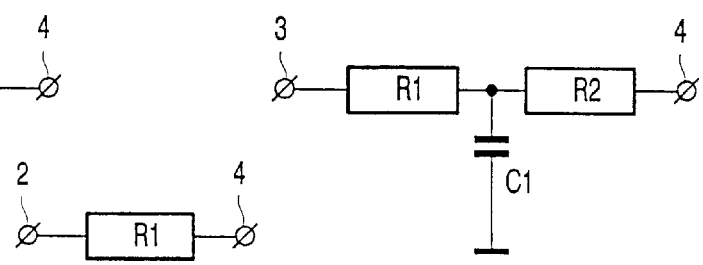
FIG. 2C
FIG. 2A

AC-DC CONVERTER ADDING AN OFFSET SIGNAL TO AN INDUCTOR CURRENT SIGNAL

The invention relates to an AC-DC converter comprising input terminals which are to be connected to the poles of a supply voltage source supplying an alternating voltage and output terminals, rectifier means coupled to the input terminals for rectifying the alternating voltage, an inductive element coupled to the rectifier means, a buffer capacitance coupled to the output terminals, a unidirectional element coupled between the inductive element and the buffer capacitance, a switching element coupled to the inductive element for controlling a current through the inductive element, a control circuit coupled to a control electrode of the switching element for generating a periodic control signal for rendering the switching element alternately conducting and non-conducting at a frequency f, and provided with a first circuit part for generating a first signal which is a measure of the instantaneous amplitude of the current in the inductive element, and a second circuit part for generating a second signal which is directly proportional to the instantaneous value of the amplitude of the alternating voltage, a comparator a first input of which is coupled to an output of the first circuit part, a second input of which is coupled to an output of the second circuit part, and an output of which is coupled to the control electrode of the switching element.

Such an AC-DC converter is disclosed in U.S. Pat. No. 4,683,529. The control circuit of the known AC-DC converter renders the switching element conducting during a first time interval t-on, which is substantially constant during each half period of the alternating voltage supplied by the supply voltage source. During the first time interval t-on, the current in the inductive element increases substantially linearly. The value of t-on corresponds to the power taken at the output terminals. As the value of t-on is substantially constant during each half period of the alternating voltage, the value of the current taken from the supply voltage source, averaged over a period of the control signal, is substantially proportional to the instantaneous amplitude of the alternating voltage. It is thus achieved that the power factor of the known AC-DC converter is comparatively high. During the second time interval t-off, the current in the inductive element decreases substantially linearly. In the known AC-DC converter, the control circuit renders the switching element conducting again almost immediately after the current in the inductive element has become substantially equal to zero. This control of the switching element is referred to as "transition mode". As the current in the inductive element is substantially zero, the same applies to the current through the unidirectional element. It is thus achieved that, when the switching element becomes conducting, only a comparatively small power dissipation occurs in the unidirectional element. The frequency of the control signal is often chosen to be comparatively high because this enables both the inductive element and EMI filters, which are often arranged between the input terminals and the rectifier means, to be chosen so as to be comparatively small. As a result, the AC-DC converter is comparatively small and inexpensive. However, if the power taken at the output terminals decreases, or if the amplitude of the alternating voltage supplied by the voltage supply source increases, the value of t-on is reduced by the control circuit. Also at such a low value of the power taken or at a comparatively high value of the amplitude of the alternating voltage, the known AC-DC converter operates in the transition mode, as a result of which the frequency of the control signal increases. A drawback of the known AC-DC converter resides in that, at a high frequency, the majority of the known control circuits are insufficiently capable of sufficiently accurately controlling the time interval t-on, so that instabilities in the operation of the AC-DC converter may occur. The quantity of power dissipated in the switching element also is comparatively high at a comparatively high frequency of the control signal.

It is an object of the invention to provide an AC-DC converter which can operate in a stable manner over a large range of the power taken and over a large range of the amplitude of the alternating voltage supplied by the supply voltage source, and which has a high power factor, a low THD and a low power dissipation in the components.

To achieve this, an AC-DC converter of the type mentioned in the opening paragraph is characterized in accordance with the invention in that the control circuit additionally comprises a third circuit part for generating an offset signal, and an adder circuit part for combining the first signal and the offset signal, an output of which is coupled to the first input of the comparator.

It has been found that an AC-DC converter in accordance with the invention can be used in a comparatively large range of the amplitude of the alternating voltage and in a comparatively large range of the power taken at the output terminals. Within these two ranges, the power factor of the AC-DC converter is comparatively high and the THD is comparatively low.

Good results have been obtained using an AC-DC converter in accordance with the invention wherein the offset signal has a constant amplitude. If the offset signal has a constant amplitude, then the AC-DC converter does not take power from the voltage-supply source in the vicinity of the zero-crossings of the alternating voltage. A constant amplitude for the offset signal can be achieved in a comparatively simple manner in that the third circuit part comprises an ohmic resistance.

Good results have also been achieved with embodiments of an AC-DC converter in accordance with the invention, wherein the offset signal is a periodic signal whose frequency is equal to the frequency of the rectified alternating voltage. More particularly, good results are achieved, particularly when the power taken at the output terminals is comparatively small, if the amplitude of the offset signal is at a local minimum when the amplitude of the rectified alternating voltage is maximal. Such a form of the offset signal can be achieved in a comparatively simple and very reliable manner in that the inductive element comprises an auxiliary winding, and the third circuit part is coupled to said auxiliary winding and provided with a series arrangement of a diode and two impedances, and a capacitive element coupled to a junction point of the two impedances.

The impedances preferably comprise ohmic resistances.

In a further embodiment of an AC-DC converter in accordance with the invention, the third circuit part is coupled to an output of the control circuit, and the third circuit part is provided with a series arrangement of two impedances and with a capacitive element coupled to a junction point of both impedances. Good results have also been achieved by using this embodiment. The impedances preferably comprise ohmic resistances.

These and other aspects of the invention will be apparent from and elucidated with reference to the embodiment(s) described hereinafter.

In the drawings:

FIG. 1 diagrammatically shows an example of an AC-DC converter in accordance with the invention to which a load is connected;

FIG. 2 shows a number of embodiments of a part of the example shown in FIG. 1, and FIG. 3 shows the form of the average current in the inductive element, and the form of the offset signal for the various embodiments shown in FIG. 2.

In FIG. 1, K1 and K2 denote input terminals which are to be connected to a supply voltage source supplying an alternating voltage. The input terminals K1 and K2 are coupled to respective inputs of rectifier means DB which, in this example, are formed by a diode bridge DB. Outputs of the diode bridge are connected to each other by means of a series arrangement of ohmic resistances RM1 and RM2. The series arrangement of ohmic resistances RM1 and RM2 is shunted by a series arrangement of coil L, switching element Q and ohmic resistance RCS. In this example, the coil L forms an inductive element and is provided with an auxiliary winding L'. The series arrangement of switching element Q and ohmic resistance RCS is shunted by a series arrangement of diode D and capacitor C. Diode D forms a unidirectional element and capacitor C forms a buffer capacitance. A junction point of ohmic resistance RCS and capacitor C is formed by a first output terminal K3. A junction point of diode D and capacitor C is formed by a second output terminal K4. Capacitor C is shunted by a series arrangement of ohmic resistances RI1 and RI2. A load ZLD is connected to the output terminals K3 and K4. A control circuit for generating a control signal used to render the switching element alternately conducting and non-conducting is formed by ohmic resistances RM1, RM2, RZC, ZCOMP, RF, RCS, RI1 and RI2, auxiliary winding L', capacitor CF and circuit parts III and IV. A first end portion of the auxiliary winding L' is connected to the first output terminal K3. A second end portion of auxiliary winding L' is connected, via ohmic resistance RZC, to a first input of circuit part IV. In this example, circuit part IV is formed by an IC, such as IC L6561 by ST Microelectronics. A second input of circuit part IV is connected to an output of circuit part VDC. Circuit part VDC is a direct current source feeding the circuit part IV. A third input of circuit part IV is connected to a junction point of ohmic resistances RM1 and RM2. Ohmic resistances RM1 and RM2 form part of a second circuit part for generating a second signal which is directly proportional to the instantaneous value of the amplitude of the alternating voltage. A fourth input of the circuit part IV is connected, via an ohmic resistance ZCOMP, to a junction point of ohmic resistances RI1 and RI2. A fifth input of circuit part IV is directly connected to the junction point of ohmic resistances RI1 and RI2. A sixth input of the circuit part IV is connected to output terminal K3. Ohmic resistance RCS is shunted by a series arrangement of capacitor CF and ohmic resistance RF. Ohmic resistance RCS, ohmic resistance RF and capacitor CF jointly form a first circuit part for generating a first signal that is a measure of the instantaneous amplitude of the current in the coil L. A seventh input of circuit part IV is connected to an output of the first circuit part formed by a junction point of ohmic resistance RF and capacitor CF. A control electrode of the switching element Q is connected to an output of circuit part IV. Circuit part III forms a third circuit part for generating an offset signal. An output of circuit part III is connected to the output of the first circuit part. This connection forms an adder circuit part for combining the first signal and the offset signal. Circuit part III also comprises an input. Circuit part III may be embodied in different ways. Three embodiments of circuit part III are shown in FIG. 2. Dependent upon the embodiment of circuit part III, the input of circuit part III is connected to another terminal in the AC-DC converter. Possible connections are indicated in FIG. 1 by means of dotted lines. If circuit part III is formed by an ohmic resistance R1, as shown in FIG. 2a, then the input of circuit part III is connected to the output of circuit part VDC. If the circuit part III is formed by diode D1, ohmic resistances R1 and R2 and capacitor C1, as indicated in FIG. 2b, then the input of circuit part III is connected to a junction point of auxiliary winding L' and ohmic resistance RZC. If the circuit part III is formed by ohmic resistances R1 and R2 and capacitor C1, as indicated in FIG. 2c, then the input of circuit part III is connected to the output of circuit part IV.

The operation of the example shown in FIG. 1 is as follows. If the input terminals K1 and K2 are connected to a supply voltage source supplying an AC voltage, this AC voltage is rectified by the diode bridge DB and the rectified AC voltage is present between the outputs of the diode bridge DB. At the junction point of ohmic resistances RM1 and RM2, and hence at the third input of circuit part IV, there is a signal which is directly proportional to the instantaneous value of the amplitude of the AC voltage. At the junction point of ohmic resistances RI1 and RI2, there is a signal which is directly proportional to the instantaneous value of the amplitude of the voltage between terminals K3 and K4, i.e. the amplitude of the output voltage. The signal present at the fourth input of circuit part IV is also directly proportional to the amplitude of the output voltage. From the signal present at the fourth input of circuit part IV, a new signal is derived by a first part of the circuit part IV, which new signal is inversely proportional to the amplitude of the output voltage. A multiplier circuit, which also forms part of circuit part IV, multiplies this new signal by the signal present at the third input of circuit part IV. The result of this multiplication forms the second signal. In this example, the second signal, thus, is not only dependent on the amplitude of the alternating voltage but also on the amplitude of the output voltage. This second signal is present at the second input of a comparator, which also forms part of circuit part IV. A first input of this comparator is connected to the seventh input of the circuit part IV. At this seventh input, there is a signal, which is the sum of the first signal generated by the first circuit part and the offset signal generated by circuit part III. An output of the comparator is coupled to the output of circuit part IV. If the circuit part IV has detected, via the auxiliary winding and the first input, that the current in coil L has become substantially zero, then the switching element Q is rendered conducting, provided the second signal is larger than the signal present at the first input of the comparator. This signal at the first input is substantially equal to the offset signal since the coil current is substantially zero. If the second signal is smaller than the offset signal, the switching element is not rendered conducting. When the switching element Q is conducting, a current flows through the coil L and through the switching element Q. The amplitude of this current increases linearly until the signal at the first input of the comparator is approximately equal to the signal at the second input. At that instant, the switching element Q is rendered non-conducting via the output of the comparator. When the switching element Q is non-conducting, the current through the coil L decreases substantially linearly, and this current charges the capacitor C. It has been found that, by virtue of the presence of the offset signal, the AC-DC converter can be used in a comparatively large range of the amplitude of the alternating voltage and in a comparatively large range of the power taken at the output terminals. Within these two ranges, the power factor of the AC-DC converter is comparatively high and the THD is comparatively low.

FIG. 3 shows, for the various embodiments of circuit part III indicated in FIG. 2 and for various values of the power (P1, P2 and P3) taken at the output terminals, the form of the offset voltage Va and the time-average value of the coil current IL as a function of time over a time interval equal to a period T of the alternating voltage.

FIG. 3a corresponds to the embodiment of circuit part III shown in FIG. 2a. FIG. 3a shows that the offset signal has a constant amplitude and that the time-average value of the coil current is zero in the vicinity of the zero crossings of the alternating voltage, so that no power is taken from the electric mains.

Figure 3B:
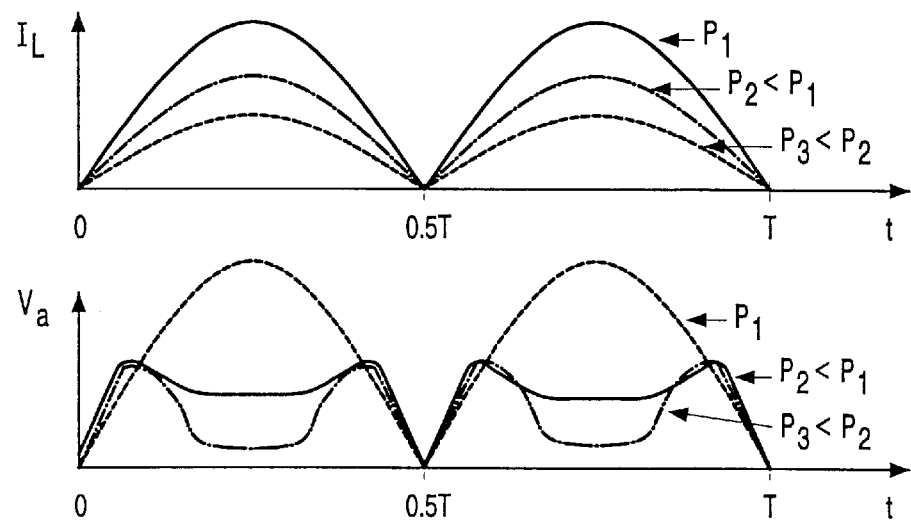

FIG. 3b corresponds to the embodiment of circuit part III shown in FIG. 2b. FIG. 3b shows that the offset signal has a time-dependent amplitude. FIG. 3b also shows that the amplitude of the offset signal also depends on the power taken at the output terminals. The amplitude of the offset signal, at a maximum value of the amplitude of the alternating voltage (t=0.25 T and t=0.75 T), decreases as the power decreases, while the amplitude of the offset signal in the vicinity of the zero crossings of the alternating voltage (t=0, t=0.5 T and t=T) increases as the power decreases. The time-average value of the coil current is shown for the various values of the power taken.

Figure 3C:
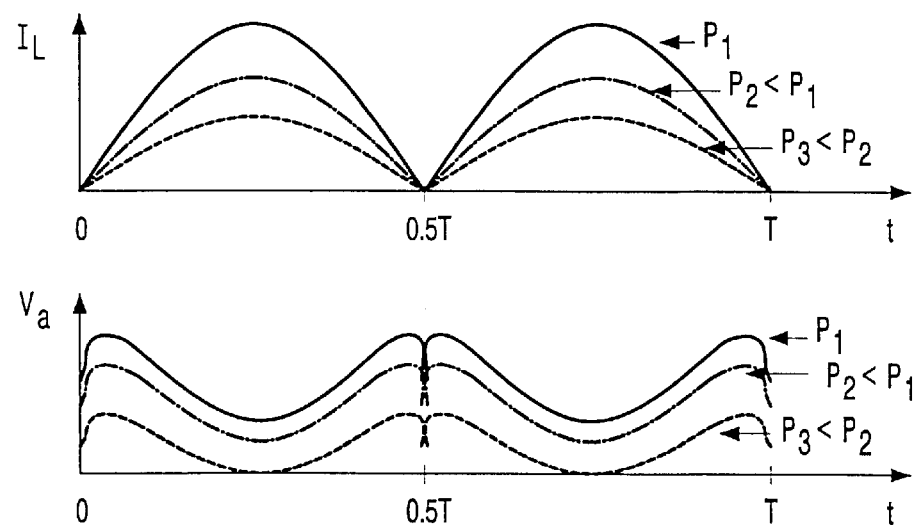

FIG. 3c corresponds to the embodiment of circuit part III shown in FIG. 2c. FIG. 3c shows that, also for this embodiment, the offset signal is at a local minimum when the amplitude of the alternating voltage is maximal (t=0.25 T and t=0.75 T). This minimum becomes smaller as the power taken at the output becomes smaller. The offset signal reaches a maximum value in the vicinity of the zero crossings of the alternating voltage (t=0, t=0.5 T and t=T). The time-average value of the coil current is shown for the various values of the power taken.

A practical embodiment of an AC-DC converter in accordance with the invention, wherein circuit part III was embodied as shown in FIG. 2b, was used in a ballast for feeding a low pressure mercury vapor discharge lamp of the type TL5 (Philips) having a rated power of 35 W. The effective value of the alternating voltage was 230 V. If the power consumed by the lamp was approximately 20 W, then the frequency of the control signal varied (in dependence upon the instantaneous value of the amplitude of the alternating voltage) between 330 kHz and 380 kHz. In the case of a reduction of the power consumed by the lamp to approximately 15 W, this frequency range of the control signal varied between 410 kHz and 550 kHz. A further reduction of the power consumed by the lamp to approximately 10 W resulted in a frequency range between 270 kHz and 500 kHz, so that the average frequency of the control signal was lower than in the case of a 15 W power consumption by the lamp. It has also been found that throughout this range of power consumed by the lamp, the THD was comparatively low and the AC-DC converter met the EN55015 requirements for EMI and the EN61000-3-2 requirements as regards performance. In a separate experiment it was found that, if the offset voltage was not added to the first signal, stable operation of the AC-DC converter at a lamp power consumption of 10 W was impossible.

What is claimed is:

1. An AC-DC converter comprising input terminals which are to be connected to the poles of a supply voltage source supplying an alternating voltage and output terminals, rectifier means coupled to the input terminals for rectifying the alternating voltage, an inductive element coupled to the rectifier means, a buffer capacitance coupled to the output terminals, a unidirectional element coupled between the inductive element and the buffer capacitance, a switching element coupled to the inductive element for controlling a current through the inductive element, a control circuit coupled to a control electrode of the switching element for generating a periodic control signal for rendering the switching element alternately conducting and non-conducting at a frequency f, and provided with a first circuit part for generating a first signal which is a measure of the instantaneous amplitude of the current in the inductive element, and a second circuit part for generating a second signal which is directly proportional to the instantaneous value of the amplitude of the alternating voltage, a comparator a first input of which is coupled to an output of the first circuit part, a second input of which is coupled to an output of the second circuit part, and an output of which is coupled to the control electrode of the switching element, characterized in that the control circuit additionally comprises a third circuit part for generating an offset signal, and an adder circuit part for combining the first signal and the offset signal, an output of which is coupled to the first input of the comparator.

2. An AC-DC converter as claimed in claim 1, wherein the offset signal has a constant amplitude.

3. An AC-DC converter as claimed in claim 2, wherein the third circuit part comprises an ohmic resistance.

4. An AC-DC converter as claimed in claim 1, wherein the offset signal is a periodic signal whose frequency is equal to the frequency of the rectified alternating voltage.

5. An AC-DC converter as claimed in claim 4, wherein the amplitude of the offset signal is at a local minimum when the amplitude of the rectified alternating voltage is maximal.

6. An AC-DC converter as claimed in claim 1, wherein the inductive element comprises an auxiliary winding, and the third circuit part is coupled to said auxiliary winding and provided with a series arrangement of a diode and two impedances, and a capacitive element coupled to a junction point of the two impedances.

7. An AC-DC converter as claimed in claim 6, wherein the impedances preferably comprise ohmic resistances.

8. An AC-DC converter as claimed in claim 1, wherein the third circuit part is coupled to an output of the control circuit, and the third circuit part is provided with a series arrangement of two impedances and with a capacitive element coupled to a junction point of both impedances.

9. An AC-DC converter as claimed in claim 8, wherein the impedances comprise ohmic resistances.

* * * * *

UNITED STATES PATENT AND TRADEMARK OFFICE
CERTIFICATE OF CORRECTION

PATENT NO.    : 6,411,533 B1
DATED         : June 25, 2002
INVENTOR(S)   : Yamamoto et al.

It is certified that error appears in the above-identified patent and that said Letters Patent is hereby corrected as shown below:

<u>Title page,</u>
Insert -- [*] Notice:  Under 35 U.S.C. 154(b), the term of this patent shall be extended for 920 days. --.

Signed and Sealed this

Thirteenth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,411,533 B2 Page 1 of 1
DATED : June 25, 2002
INVENTOR(S) : Christofher Daniel Charles Hooijer et al.

It is certified that error appears in the above-identified patent and that said Letters Patent is hereby corrected as shown below:

This certificate supersedes Certificate of Correction issued May 13, 2003, the number was erroneously mentioned and should be vacated since no Certificate of Correction was granted.

Signed and Sealed this

Twenty-eighth Day of June, 2005

JON W. DUDAS
*Director of the United States Patent and Trademark Office*